United States Patent Office

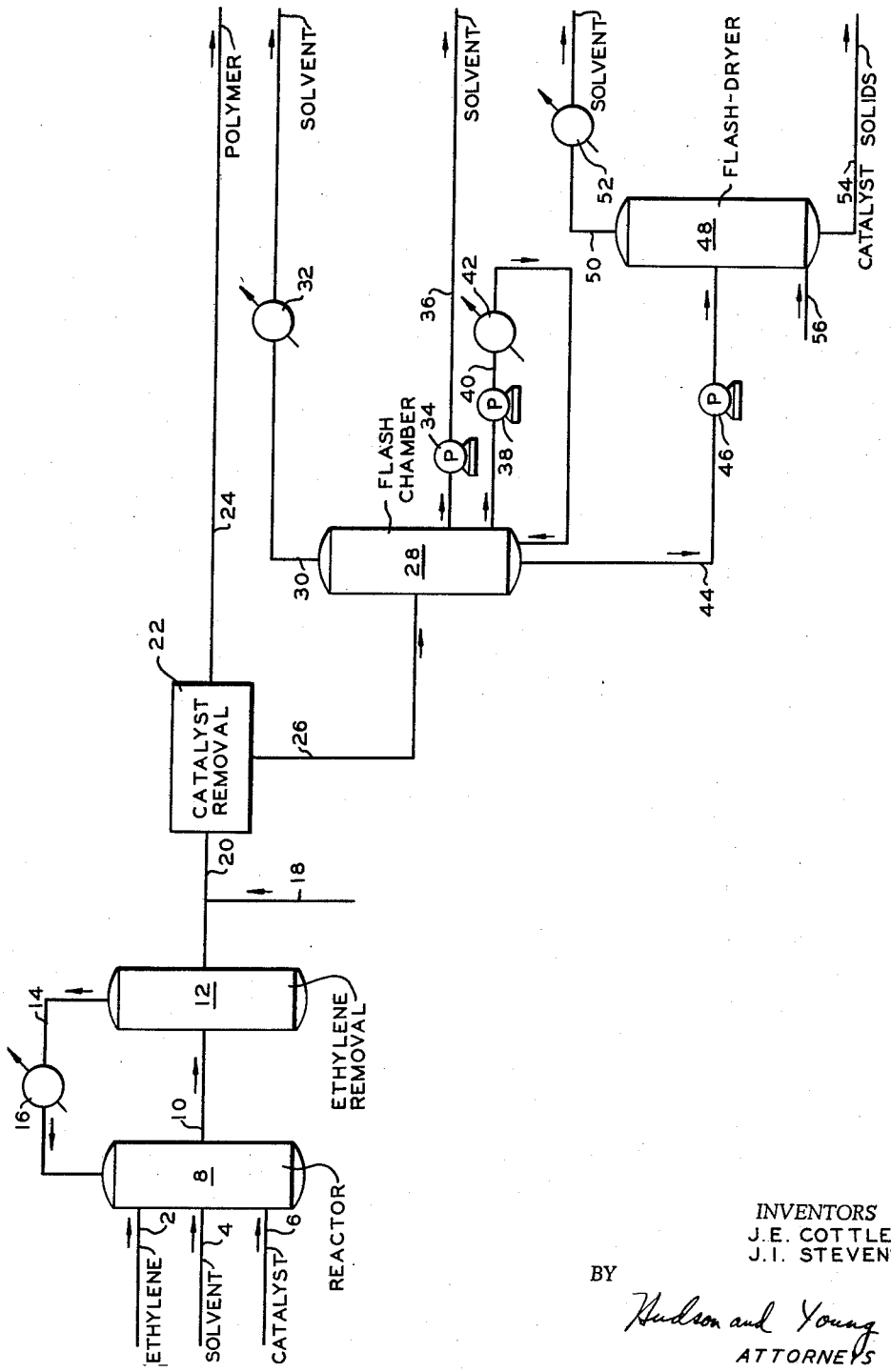

3,004,019
Patented Oct. 10, 1961

---

3,004,019
SOLIDS RECOVERY PROCESS
James I. Stevens, Idaho Falls, Idaho, and John E. Cottle, Bartlesville, Okla., assignors to Phillips Petroleum Company, a corporation of Delaware
Filed Apr. 29, 1957, Ser. No. 655,598
16 Claims. (Cl. 260—94.9)

This invention relates to the recovery of solids from a polymer solution. In one aspect it relates to the recovery of solid subdivided polymerization catalyst from a dilute solution of olefin polymer.

In certain methods of preparing solid polymers, such as polymers of ethylene, the product is obtained as a solution of polymer in a solvent or diluent material and contains finely subdivided catalyst solids. Generally, it is desirable that the final polymer product be free of catalyst solids, and it may also be desirable to recover the catalyst for reuse in the polymerization reaction. Recovery of the polymer from the polymerization reaction effluent is usually affected by one of a number of methods including centrifugation, filtration, and the like. While these various methods are effective in providing separation of the major portion of the polymer product, some of the polymer remains in solution. In addition, there is formed in the polymerization reaction an amount of heavy, relatively insoluble polymer which becomes associated with the catalyst solids and thus also remains in the reaction effluent after removal of the polymer product. The presence of the heavy insoluble polymer and the minor portion of other polymer product which remains in the reaction effluent along with the catalyst and solvent complicates the separation and recovery of the catalyst and solvent in that the polymer tends to be very sticky when associated with minor amounts of solvent and is thus inclined to agglomerate and adhere to process equipment. This makes it desirable to operate in such a manner that polymerization effluent which remains after removal and recovery of the polymer product, contains a relatively large proportion of solvent and a minor proportion of polymer and catalyst solids.

One method of treating such a dilute solids containing polymer solution is provided in the patent of J. E. Cottle, Patent Number 2,914,518, issued November 24, 1959. In Cottle's method the material remaining after recovery of the polymer product, which in this operation is underflow from a centrifuging zone, is contacted with cold solvent under conditions of agitation whereby the mixture is reduced to a low temperature level and catalyst agglomerates and separates from solution. Following this step excess solvent is removed by decantation or filtering after which the polymer-catalyst agglomerate is dryed.

The method of this invention comprises an improvement over the method described in the Cottle application.

It is an object of this invention to provide an improved process for the recovery of solids from a polymer solution.

Another object of this invention is to provide an improved process for recovering catalyst solids from a dilute polymer solution.

Still another object of this invention is to provide an improved process for recovering chromium oxide catalyst solid from a dilute solution of ethylene polymer.

These and other objects of the invention will become more readily apparent from the following detailed description and discussion.

The foregoing objects are achieved broadly by reducing the temperature of a polymer solution containing solids, such as catalyst solids, to agglomerate the solids, decanting a portion of the supernatant liquid, heating the remaining material to redisperse the agglomerated solids and flash-drying the dispersion to produce dry solids.

In one aspect of the invention, catalyst solids are recovered from a dilute polymer solution comprising the residue product stream from a centrifugation treatment of a polymerization reaction effluent.

In another aspect of the invention the catalyst solids are recovered from a dilute slurry of catalyst in a polymer solution, said slurry being solvent washed filtercake obtained in the filtration treatment of the polymerization reaction effluent.

This invention is applicable in general to the recovery of solids from a solution of olefin polymer such as, for example, a polymer or a copolymer of a monoolefin like ethylene, propylene, butylene, etc.; also, copolymers of monoolefins and diolefins such as butadiene, isoprene, etc. These polymers are prepared usually by contacting the olefin to be polymerized with a catalyst in the presence of a solvent or diluent material at an elevated temperature and pressure. A number of catalytic materials can be used for the purpose of polymerizing olefins, the most desirable being chromium oxide, preferably containing hexavalent chromium, with silica, alumina, zirconia, thoria, silica-alumina, etc. These catalysts can be prepared, for example, by contacting soluble salts of chromium with silica, alumina, thoria, etc., for a sufficient period of time to impregnate the latter material. Following this, excess liquid is removed, for example, by filtering after which the solid catalyst is dried and activated at temperatures in the range of 450° F. to 1500° F. under non-reducing conditions for several hours. For a detailed discussion of the catalysts, their composition and their methods of preparation, reference can be had to the patent of Hogan et al., Patent Number 2,825,721, issued March 4, 1958, wherein the catalysts are discussed in detail. These and other solid catalysts or catalysts containing a solid component can be treated in the method of this invention.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is maintained at a sufficient level to assure a liquid phase reaction, that is, at least about 100 to 300 p.s.i.g., depending upon the type of feed material and the polymerization temperature. Higher pressures up to 500 to 700 p.s.i.g. or higher can be used, if desired. The catalyst concentration in the reactor varies from between about 0.01 and about 10 percent by weight. Generally, it is desirable to provide a reactant residence time of between about 15 minutes and about 12 hours.

The use of a diluent in the polymerization reaction in general serves two purposes. Since the reactions are usually exothermic in nature, the presence of a quantity of diluent provides a method for obtaining close control of the reaction temperature. In addition, as previously stated, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually the olefin constitutes between about 0.1 and about 25 percent by volume of the mixture and preferably between about 2 and about 15 percent by volume.

The solvent or diluent employed in the polymerization reaction includes in general, paraffin hydrocarbons. Among the more useful solvents are acyclic hydrocarbons having between about 3 and about 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, such as cyclohexane, methylcyclohexane, etc. Aromatic diluents can also be used; however, in some instances they (or impurities therein) tend to shorten the catalyst life, therefore, their use will depend on the importance of catalyst life. All of the foregoing and in addition, other hydrocarbon diluents which are relatively inert and in the liquid state at the reaction conditions may also be employed in carrying out the reaction of olefins to form solid polymers.

Although the invention is applicable to polymerization systems in general, it finds particular use in processes for the polymerization of 1-olefins having a maximum of 8 carbon atoms per molecule and no branching nearer the double bond than the 4-position; and more particularly in processes for the polymerization of ethylene under conditions which provide polymers of ethylene which have a density of at least 0.94 and preferably 0.96 or higher and a crystallinity of at least 70 percent and preferably at least 80 percent at normal atmospheric temperatures. While the polymerization of ethylene provides a preferred embodiment of the invention, it is not intended that the scope of the invention be limited thereby but that any of the other processes described are also within the invention.

One method of preparing polymers of olefins is described in detail in the patent of Hogan et al., supra. This particular method utilizes a chromium oxide catalyst, preferably containing hexavalent chromium, with silica, alumina, silica-alumina, zirconia, thoria, etc. In the method of the Hogan et al. application, olefins are polymerized in the presence of a hydrocarbon diluent, for example, an acyclic, alicyclic or aromatic compound which is inert and in which the formed polymer is soluble. The reaction is ordinarily carried out at a temperature between about 150° F. and about 450° F. and under a pressure sufficient to maintain the reactant and diluent in the liquid state. The polymers produced by this method, particularly the polymers of ethylene, are characterized by having an unsaturation which is principally either trans-internal or terminal vinyl, depending on the particular process conditions employed. When low reaction temperatures, about 150° F. to about 320° F., and mobile catalyst are used for polymerization, the product polymer is predominantly terminal vinyl in structure. When polymerization is carried out at higher temperatures and in a fixed catalyst bed, the polymer has predominantly trans-internal unsaturation. Polymers prepared by both methods are also characterized by their high densities and high percentage of crystallinity at ambient temperatures.

In carrying out the invention in one embodiment thereof, a heated dilute slurry of catalyst solid in polymer solution is reduced in temperature to agglomerate the solids. The slurry can be obtained from any source, however, usually the solution to be treated is the residue from the treatment of a polymerization effluent to effect recovery of polymer product therefrom. Thus, for example, in the patent of J. E. Cottle, Patent Number 2,914,518, issued November 24, 1959, a dilute slurry of catalyst solids in polymer solution is obtained as underflow from the second of two centrifuges which are operated in series to provide removal of polymer product from a polymerization reaction effluent.

In another method a dilute polymer solution having a low catalyst solids content is obtained from the filtration step which is utilized in the preliminary recovery of catalyst solids from a polymerization reaction effluent. Either of the foregoing streams or other streams which contain a major proportion of solvent material and a minor proportion of polymer and catalyst solids or other solids can be treated within the scope of this invention.

When agglomerating the catalyst solids, temperature reduction of the polymer solution is carried down to a suitable level whereby polymer is precipitated from solution. Preferably this operation is carried out under conditions of mild agitation. The initial precipitation temperature of polymer from the solution varies depending on the particular polymer being treated and the solvent in which the polymer is dissolved. For example, when treating an ethylene polymer dissolved in cyclohexane precipitation usually begins in a temperature range of between about 230 and 200° F. When treating other polymers in the various solvents which are employed in carrying out the polymerization reaction, the initial precipitation temperature can vary over a relative wider range such as from about 300° F. to about 200° F. In general, to provide complete agglomeration of the catalyst it is usually desirable that the temperature reduction be continued beyond that point of initial precipitation of polymer. When treating ethylene polymer in cyclohexane the preferred temperature is between about 210 and about 190° F. When processing other polymers dissolved in the various solvents previously discussed, the temperature range of maximum agglomeration is between about 250° F. and about 200° F. depending on the particular polymer and solvent being treated.

As previously stated, the solution being treated comprises a major portion of solvent material. More usually, the amount of solvent comprises between about 60 and 99 percent by weight of the total solids containing solution. The amount of polymer present in the solution, particularly insoluble polymer, is conveniently measured relative to the amount of catalyst present. Thus, the catalyst can have associated with it insoluble heavy polymer in amount to provide catalyst solids containing from about 25 percent to about 80 percent of polymer by weight and the total quantity of polymer in the solution can be as high as 90 to 99.75 percent by weight based on the polymer plus catalyst solids.

The reduction in temperature necessary to accomplish the desired cooling of the polymer solution and agglomeration of the catalyst can be provided by several methods, including flash vaporization of a portion of the solvent from the polymer solution, indirect heat exchange of the polymer solution with a cooling material, gradual vaporization or auto refrigeration of the polymer solution, by introducing cold solvent to the polymer solution, and the like. Since one of the purposes of the invention is to separate catalyst solids from an already dilute solution usually the last method of cooling is not preferred.

As one result of the agglomeration step, a substantial amount of the polymer present in the original solution becomes associated with the catalyst solids. Thus, the supernatant liquid remaining after agglomeration of the catalyst comprises essentially solvent. In the second step of the process the catalyst agglomerates are allowed to settle and a substantial portion of the supernatant liquid is separated from the catalyst by decantation. Preferably decantation is accomplished in the same vessel as agglomeration. Settling of the agglomerated solids is accomplished by terminating the feed to the agglomerating vessel when the vessel is substantially filled with liquid.

Following decantation the temperature of the remaining solvent is increased whereby the catalyst agglomerates are redispersed in the solution. Preferably agitation is provided in conjunction with the temperature increase. The temperature level required to effect redispersion of the catalyst agglomerates is, in general, at least as high as the original polymer solution entering the agglomeration zone, that is, between about 200° F. and 500° F. In this temperature range any normally soluble polymer present is returned to solution. The heat required for the redispersion operation can be provided by any suitable means, preferably however, by circulating heated solvent through the agglomeration zone, said solvent being heated either inside or outside said zone.

In the final step of the solids recovery the redispersed solids are passed from the agglomeration and redispersing zone to a flash drying zone wherein the remaining solvent is removed and dry solids are obtained as a product. The flash drying can be carried out by either of two methods. In one method, sufficient heat is provided in the redispersion step to vaporize the entire remaining solvent upon introduction of the dispersion to the low pressure flash zone. In the other method, the amount of heat supplied in the redispersing is sufficient to vaporize the major portion of the remaining solvent whereby wet particulate solids are provided in the low pressure flash zone. The complete drying of the solids is then effected by passing the solids downwardly through said zone countercurrent to a heated vapor, such as superheated solvent material. In either method the pressure of the flash drying zone is substantially reduced usually to about atmospheric pressure or slightly below. If desired, suitable vacuum producing equipment such as a barometric condenser and barometric leg, steam ejector, etc., can be provided in conjunction with the flash drying step. The final dry solids product comprises the polymerization catalyst and a substantial amount of the polymer originally present in the solution entering the agglomeration zone. Thus, the various product streams formed during the process, other than the catalyst solids, namely, the overhead vapor from the agglomeration zone, the decanted liquid from the agglomeration zone and the material flashed from the flash dryer, all comprise substantially pure solvent. These streams can be combined for recycle to the polymerization process or can be yielded from the unit either combined or separately for other use.

In order to more clearly describe the invention and to provide a better understanding thereof reference is had to the accompanying drawing which is a diagrammatic illustration of a polymerization reactor, ethylene removal stage, polymer removal stage and a flash chamber and a flash dryer suitable for carrying out the method of this invention.

Referring to the drawing ethylene, cyclohexane diluent and chromium oxide catalyst are introduced to reactor 8 through conduits 2, 4, and 6 respectively. For ease of handling the catalyst is slurried in cyclohexane before it is introduced into the reactor. During polymerization, the material in the reactor is maintained in a highly agitated state by means of a mechanical mixer or other conventional mixing means (not shown). The reaction is carried out at a temperature of about 285° F. and a pressure of 500 p.s.i.a. and for a sufficient period of time to convert a portion of the ethylene feed to solid ethylene polymer (at ambient temperature). Reaction effluent leaves the reactor through conduit 10 and enters separation zone 12 from which a stream, comprising principally unconverted ethylene and some solvent, is separated and returned to the reactor through conduit 14 and cooler 16. Following this step the effluent is combined with additional solvent introduced through conduit 18.

The mixture now comprising a solution of solid ethylene polymer in cyclohexane containing a finely subdivided catalyst, is introduced to catalyst removal step 22 through conduit 20. Catalyst removal is effected by any suitable means, such as by centrifugation, filtration, and the like. In this specific instance removal of the catalyst is effected by centrifugation, polymer solution being yielded from the unit through conduit 24.

One of the streams from the catalyst removal step comprises finely subdivided catalyst solids associated with some polymer, in a dilute solution of polymer in cyclohexane. It is desirable that both the catalyst and the solvent be recovered from this solution. As the first step in effecting the separation and recovery of these materials the solids containing solution is introduced to flash chamber 28 through conduit 26. In this vessel a substantial reduction in pressure takes place whereby a portion of the cyclohexane solvent is vaporized passing overhead through conduit 30 and condenser 32 and then from the unit. As a result of the flash the temperature of the remaining solution and the catalyst solids is reduced to about 200° F., whereby a portion of the polymer precipitates from solution and the catalyst solids are agglomerated. Flow of material through conduit 26 to the flash chamber is continued until the material in the chamber reaches a suitable predetermined level at which time feed to the flash chamber is stopped. After a suitable period of time, during which settling of the agglomerating catalyst takes place, a portion of the liquid contents of the flash chamber, comprising substantially pure solvent, is withdrawn therefrom through pump 34 and conduit 36. Following this operation the material remaining in the flash chamber is raised in temperature by circulating a portion of the contents of the chamber through pump 38, conduit 40 and heater 42. The addition of heat to the contents of the flash chamber is continued until a temperature level is reached at which the agglomerated solids become redispersed. It may be desirable in addition to the agitation obtained by the circulating stream through conduit 40 to also provide mechanical agitation in the flash chamber during the redispersion operation.

Following redispersion the contents of the flash chamber are passed through conduit 44 and pump 46 into flash dryer 48. In this vessel a further reduction in pressure is taken, usually down to substantially atmospheric. The solvent vaporized in this operation is removed overhead through conduit 50 and condenser 52. The flash dryer can be operated in at least two different manners. For example, by sufficiently raising the temperature of the material entering the dryer it is possible to flash from the dryer all of the solvent associated with the catalyst and polymer and thus obtain a dry catalyst solids product containing polymer in one operation, this material being yielded from the bottom of the flash dryer through conduit 54. In another method of operation the heat provided in the feed to the flash dryer is sufficient to vaporize, upon reduction in pressure, the main portion of the solvent leaving the solids, however, in a wetted condition. The remaining solvent is then removed from the solids as they descend through the flash dryer by a countercurrent stream of heated gas, preferably superheated solvent introduced through conduit 56. In the event that atmospheric pressure and the feed temperature obtainable are not sufficient to provide adequate drying the flash dryer can be operated below atmospheric pressure by the use of suitable vacuum producing equipment, such as a condenser and barometric leg, a steam eductor or the like.

The following example is presented in illustration of an application of a preferred embodiment of the invention on a commercial scale.

*Example*

A solid polymer of ethylene is prepared in the presence of a catalyst comprising 2.5 percent by weight of chromium as chromium oxide, containing 2.2 percent hexavalent chromium, with silica alumina (weight ratio 9 to 1), prepared by impregnating silica alumina with an aqueous solution of chromiumtrioxide, followed by drying and activation in dry air at gradually increasing temperatures up to 950° F.

The conditions obtained during this operation and in the following treating steps for the separation and recovery of polymer solid and catalyst solids are as follows:

FLOW RATES

| | Lb./hr. |
|---|---|
| Reactor feed (2, 4, 6 and 14) | 10,000 |
| Composition: | |
| Ethylene _____wt. percent__ 9.4 | |
| Cyclohexane _____do____ 90.4 | |
| Catalyst _____do____ 0.2 | |
| Polymer solution 8.8 wt. percent (24) | 9,450 |
| Flash chamber feed (26) | 720 |
| Composition: | |
| Polymer _____wt. percent__ 7.0 | |
| Catalyst _____do____ 2.8 | |
| Cyclohexane _____do____ 90.0 | |
| Flash chamber overhead (30) | 295 |
| Flash chamber decant (36) | 194 |
| Flash dryer feed (44) | 231 |
| Composition: | |
| Polymer _____wt. percent__ 21.7 | |
| Catalyst _____do____ 7.8 | |
| Cyclohexane _____do____ 70.5 | |
| Flash dryer overhead (50) | 163 |
| Dry catalyst solids (54) | 68 |
| Composition: | |
| Polymer _____wt. percent__ 73.5 | |
| Catalyst _____do____ 26.5 | |

TEMPERATURES

| | °F. |
|---|---|
| Reactor (8) | 285 |
| Ethylene removal (12) | 300 |
| Catalyst removal (22) | 300 |
| Flash chamber (28): | |
| Flash temperature | 200 |
| Reheat temperature | 456 |
| Flash dryer (48) | 180 |

PRESSURES

| | P.s.i.a. |
|---|---|
| Reactor (8) | 450 |
| Ethylene removal (12) | 150 |
| Catalyst removal (22) | 78 |
| Flash chamber (28): | |
| Flash pressure | 21 |
| Reheat pressure | 325 |
| Flash dryer (48) | 15 |

Having thus described the invention by providing a specific example thereof, it is to be understood that no undue limitations or restrictions are to be drawn by reason thereof and that many modifications and variations are within the scope of the invention.

We claim:

1. A process for recovering solids associated with insoluble polymer from a polymer solution which comprises reducing the temperature of the polymer solution whereby the solids agglomerate, decanting a portion of the supernatant liquid, heating the remaining material to redisperse the agglomerated solids, flash drying the dispersion and recovering a dry solids product.

2. The process of claim 1 in which the solids comprise a polymerization catalyst.

3. The process of claim 1 in which the solids comprise chromium oxide catalyst, containing hexavalent chromium, associated with silica-alumina.

4. A process for recovering solids comprising catalyst associated with insoluble polymer from a polymer solution which comprises reducing the temperature of the polymer solution by flashing solvent therefrom whereby the solids agglomerate, decanting a portion of the unvaporized solvent, heating the remaining material to redisperse the agglomerated solids, flash drying the dispersion and recovering a dry solids product.

5. A process for recovering solids comprising catalyst associated with insoluble polymer from a polymer solution, said insoluble polymer being sticky and adherent to process equipment when associated with minor amounts of solvent, which comprises reducing the temperature of the polymer solution by flashing solvent therefrom whereby the solids agglomerate, decanting a portion of the unvaporized solvent, heating the remaining material to redisperse the agglomerated solids, flashing a major portion of the solvent from the dispersion to provide wetted solids, spray drying said solids and recovering a dry solids product.

6. A process for recovering solids comprising catalyst associated with insoluble ethylene polymer from ethylene polymer solution, said insoluble polymer being sticky and adherent to process equipment when associated with minor amounts of solvent, which comprises reducing the temperature of the polymer solution by flashing solvent therefrom, whereby the solids agglomerate, decanting a portion of the unvaporized solvent, heating the remaining material to redisperse the agglomerated solids, flashing a major portion of the solvent from the dispersion to provide wetted solids, spray drying said solids and recovering a dry solids product.

7. The process of claim 6 in which the catalyst solids comprise chromium oxide catalyst, containing hexavalent chromium, associated with silica-alumina.

8. A process for recovering solids comprising catalyst associated with insoluble polymer from a polymer solution, said insoluble polymer being sticky and adherent to process equipment when associated with minor amounts of solvent, which comprises reducing the temperature of the polymer solution by indirect heat exchange whereby the solids agglomerate, decanting a portion of the unvaporized solvent, heating the remaining material to redisperse the agglomerated solids, flash drying the dispersion and recovering dry solids product.

9. The process of claim 8 in which the soluble and insoluble polymers are ethylene polymers.

10. The process of claim 9 in which the catalyst solids comprise chromium oxide catalyst, containing hexavalent chromium, associated with silica-alumina.

11. A process for recovering solids comprising catalyst associated with insoluble ethylene polymer from ethylene polymer solution, said insoluble polymer being sticky and adherent to process equipment when associated with minor amounts of solvent, containing a major proportion of solvent and a minor proportion of catalyst and polymer which comprises reducing the temperature of the solution whereby the solids agglomerate, decanting a portion of the supernatant liquid, heating the remaining material to redisperse the agglomerated solids, flash drying the dispersion and recovering a dry solids product.

12. The process of claim 11 in which recovery of polymer product from the polymerization effluent is effected by centrifugation.

13. The process of claim 11 in which recovery of polymer product from the polymerization reaction effluent is effected by filtration.

14. A process for recovering solids comprising catalyst associated with insoluble polymer from a polymer solution, said insoluble polymer being sticky and adherent to process equipment when associated with minor amounts of solvent, at an elevated temperature which comprises reducing the temperature of the polymer solution to between about 300 and about 200° F. whereby the solids agglomerate, decanting a portion of the unvaporized solvent, heating the remaining material to a temperature at least as high as the original polymer solution to redisperse the agglomerated solids, flash drying the dispersion and recovering dry solids product.

15. A process for recovering solids comprising catalyst associated with insoluble ethylene polymer from ethylene polymer solution, said insoluble polymer being sticky and adherent to process equipment when associated with minor amounts of solvent, at an elevated temperature which comprises reducing the temperature of the polymer solution to between about 250 and about 200° F. by flashing solvent therefrom whereby the solids agglomerate, decanting a portion of the unvaporized solvent, heating the remaining material to a temperature at least as high as the original polymer solution to redisperse the agglomerated solids, flash drying the dispersion and recovering dry solids product.

16. The process of claim 15 in which the catalyst solids comprise chromium oxide catalyst, containing hexavalent chromium, associated with silica-alumina.

References Cited in the file of this patent

UNITED STATES PATENTS

| | | |
|---|---|---|
| 2,367,474 | Stewart | Jan. 16, 1945 |
| 2,418,023 | Frey | Mar. 25, 1947 |
| 2,565,960 | Garber et al. | Aug. 28, 1951 |
| 2,726,231 | Field et al. | Dec. 6, 1955 |
| 2,849,429 | Cines | Aug. 26, 1958 |
| 2,858,902 | Cottle | Nov. 4, 1958 |
| 2,897,184 | Kimble et al. | July 28, 1959 |